United States Patent [19]

Malm

[11] 4,189,733
[45] Feb. 19, 1980

[54] ADAPTIVE ELECTRONICALLY STEERABLE PHASED ARRAY

[75] Inventor: Robert Malm, Los Angeles, Calif.

[73] Assignee: Northrop Corporation, Los Angeles, Calif.

[21] Appl. No.: 967,572

[22] Filed: Dec. 8, 1978

[51] Int. Cl.² ............................................. H04B 7/00
[52] U.S. Cl. ........................ 343/100 SA; 343/100 CL
[58] Field of Search .................. 343/100 LE, 100 CL, 343/100 SA, 854

[56] References Cited

U.S. PATENT DOCUMENTS 3,964,065  6/1976  Roberts et al. ................ 343/100 SA

*Primary Examiner*—Theodore M. Blum
*Attorney, Agent, or Firm*—Edward A. Sokolski

[57] ABSTRACT

An adaptive antenna system which enhances the desired signal in the output of the system while reducing the interference from signals arriving from directions other than that of the desired signal. The antenna system operates in conjunction with a modulation/demodulation system for spreading and despreading the spectrum of the desired signal. By a series of deterministic perturbations of phase shifters or other signal varying devices attached to the antenna elements, the system measures the effects of these perturbations: (1) on the wide-band energy in the output of the antenna, prior to spectrum despreading, and (2) on the narrow-band energy following despreading, and then adjusts the phase shifters or other signal varying devices so as to enhance the desired signal while reducing the interfering signals.

5 Claims, 18 Drawing Figures

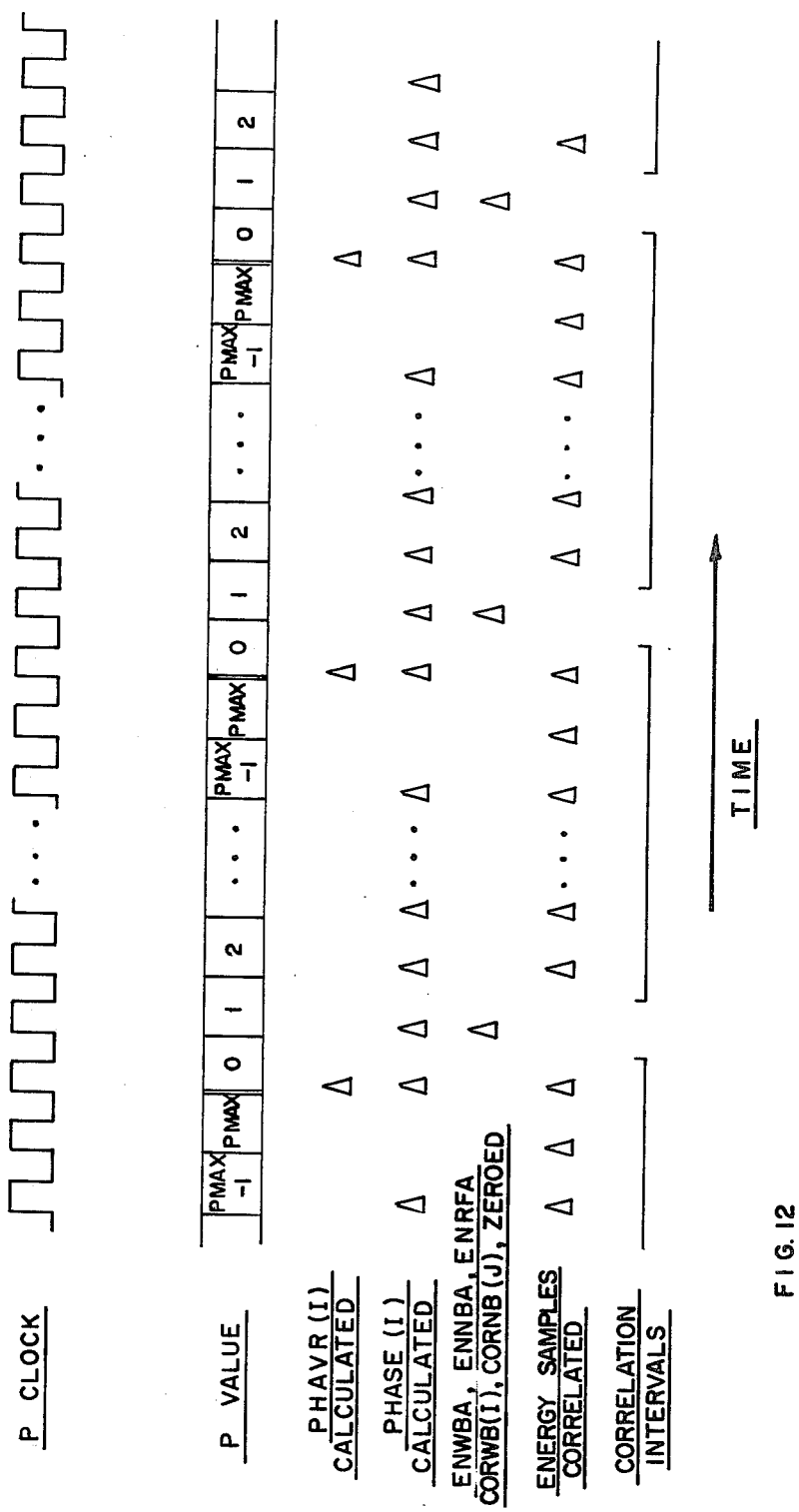

ADAPTIVE ELECTRONICALLY STEERABLE PHASED ARRAY

BACKGROUND OF THE INVENTION

1. Field of Invention

This invention relates to adaptive receiving antenna systems for simultaneously enhancing a desired signal in the output of the system while at the same time reducing interfering signals in the output of the system which have been received from directions other than that of the desired signal. This invention operates in conjunction with a method of spreading and despreading the spectrum of the desired signal wherein the bandwidth of the desired signal as received, and prior to despreading, is several times the bandwidth of the desired signal following "despreading".

2. Description of Prior Art

In a typical adaptive antenna system, the system parameters are automatically adjusted to reduce the output from the system due to interfering signals while at the same time enhancing a desired signal. Both the prior art and this system operate to orient a portion of the antenna gain pattern with low gain, in the direction of the source of interference, and at the same time operate to orient a portion of the pattern with high gain in the direction of the source of the desired signal.

Typically, the outputs from each of the elements of an array are individually modified in magnitude and phase and then combined or summed with the outputs from the other elements to produce the output of the array. The magnitude and phase of the output from each element is adjusted automatically so as to enhance the desired signal while reducing the interfering signal in the output of the array.

The AGIPA (T. T. Noji and L. Schwartz, AIL, "Multibeam Adaptive Array for RPV Anti-Jam Communication" 1975 Convention of National Association for Remotely Piloted Vehicles, June 2-4, 1975, Dayton, Ohio) adaptive antenna exemplifies one class of prior art. As illustrated in FIG. 1, in a simplified system of this general type, the output from each antenna element is split into two parts, each of which then passes through a variable phase shifter. The output from each phase shifter then is split into two more parts, one of which is combined with the similar parts of the outputs from the phase shifters associated with the other antenna elements to produce the output of the antenna system prior to despreading. The other part of the output from each variable phase shifter passes through a 90° phase shifter and is correlated with the output of the antenna system prior to despreading.

For an incremental change in the phase shift of one of the variable phase shifters, the incremental change in the output from the phase shifter occurs at right angles to the vector which represents the output, i.e., the incremental change can be represented by an incremental vector with a phase shift of 90° relative to the output vector. Accordingly, the correlation of the output of the variable phase shifter, following a 90° phase shift, with the output of the system prior to despreading indicates the direction in which the phase of the output of the phase shifter should be changed to reduce the output from the entire system prior to despreading.

In this type of system, the variable phase shifter is adjusted until the correlation of the output of the phase shifter, after a phase shift of 90 degrees, with the output of the system prior to despreading is reduced to zero.

As a consequence of the successive adjustments of the system, the output of the system, prior to despreading, is reduced towards zero, thus removing the undesired signals from the output of the system.

If the desired signal is extracted from the undesired signals in the output of the system by spectrum despreading (as described in this application with respect to the claimed invention), a technique similar to that described above also can be used to enhance the desired signal. As illustrated further in FIG. 1, a portion of the output from each variable phase shifter, after being shifted by 90°, is despread and correlated with the desired signal, i.e., the despread output of the system. The phase shifter then is adjusted (in the opposite direction to that which would have been used to reduce the output of the array) to maximize the correlation of the phase shifter output, following a 90° phase shift and despreading, with the output of the system following despreading. The two operations, that of decreasing the total output from the system prior to despreading and that of increasing the output of the desired signal following despreading, are combined in some manner by the decision logic indicated in FIG. 1 to achieve both goals more or less simultaneously.

A serious problem with the AGIPA type system is its inability to function in the signal maximizing mode when the undesired signals at the outputs of the phase shifters associated with each antenna element, following despreading, are significantly larger than the desired signals at the same points in the system. The invention disclosed herein utilizes measurements of the effect of a deterministic set of phase perturbations on the system to calculate phase shifter adjustments, and thereby avoids the above stated shortcoming of the prior art.

SUMMARY OF THE INVENTION

The system of this invention operates in conjunction with any one of a number of modulation or spectrum spreading systems which, prior to transmission, significantly spread or increase the spectrum or band-width occupied by the desired signal and, following reception, significantly reduce the bandwidth of the desired signal.

In brief the system of this invention is as follows: each of the outputs from a plurality of antenna elements is adjusted in magnitude and phase and then combined to produce the output of the array. The system measures the changes in the energy in the output of the array, prior to despreading, due to a deterministic series of perturbations of the devices which modify the phases and amplitudes of the outputs from the individual elements. The system then adjusts these devices in accordance with the results of these measurements to reduce the wide-band energy prior to despreading. This process of measurement and adjustment is repeated a number of times.

The system of this invention next implements a procedure to enhance the strength of the desired signal in the output of the system following despreading. To enhance the desired signal the system determines sets of device perturbations such that each set, at least to first order, does not change the energy in the wide-band output of the array. The system then measures the effects of such perturbations on the energy in the narrow-band output of the system following despreading. The devices then are adjusted to increase the energy in the narrow-band output of the system following despreading without, at least to first order, affecting the energy in the wide-band output of the array.

In circumstances where the application of the system of this invention is important, the energy of the interfering signals contained in the wide-band output of the array will be significantly greater than that of the desired signal. As a consequence, the initial device adjustments will be determined primarily by the interfering sources and will operate primarily to reduce the wide-band energy in the output from these interfering sources. Only if the desired signal represents a significant portion of the energy in the wide-band output of the array will the device's adjustments also operate to reduce the magnitude of the desired signal. In such circumstances, the mode of operation of the system changes from making adjustments which decrease the wide-band energy to making adjustments which increase the narrow-band energy.

Because the despreading process enhances the desired signal without enhancing the interfering signals, the desired signal will constitute a much larger fraction of the narrow-band energy than of the wide-band energy. As a consequence, the device adjustments can operate to increase the narrow-band energy, and hence the desired signal without, at least to first order, affecting the wide-band energy and the aggregate of the undesired signals.

DESCRIPTION OF THE DRAWINGS

FIGS. 9A, 9B through 11A, 11B are flow diagrams which illustrate certain phases of the operation of the controller and correlator.

FIG. 12 illustrates the temporal relationship between a number of operations performed by the controller and correlator.

PREFERRED EMBODIMENT

Figure 1:
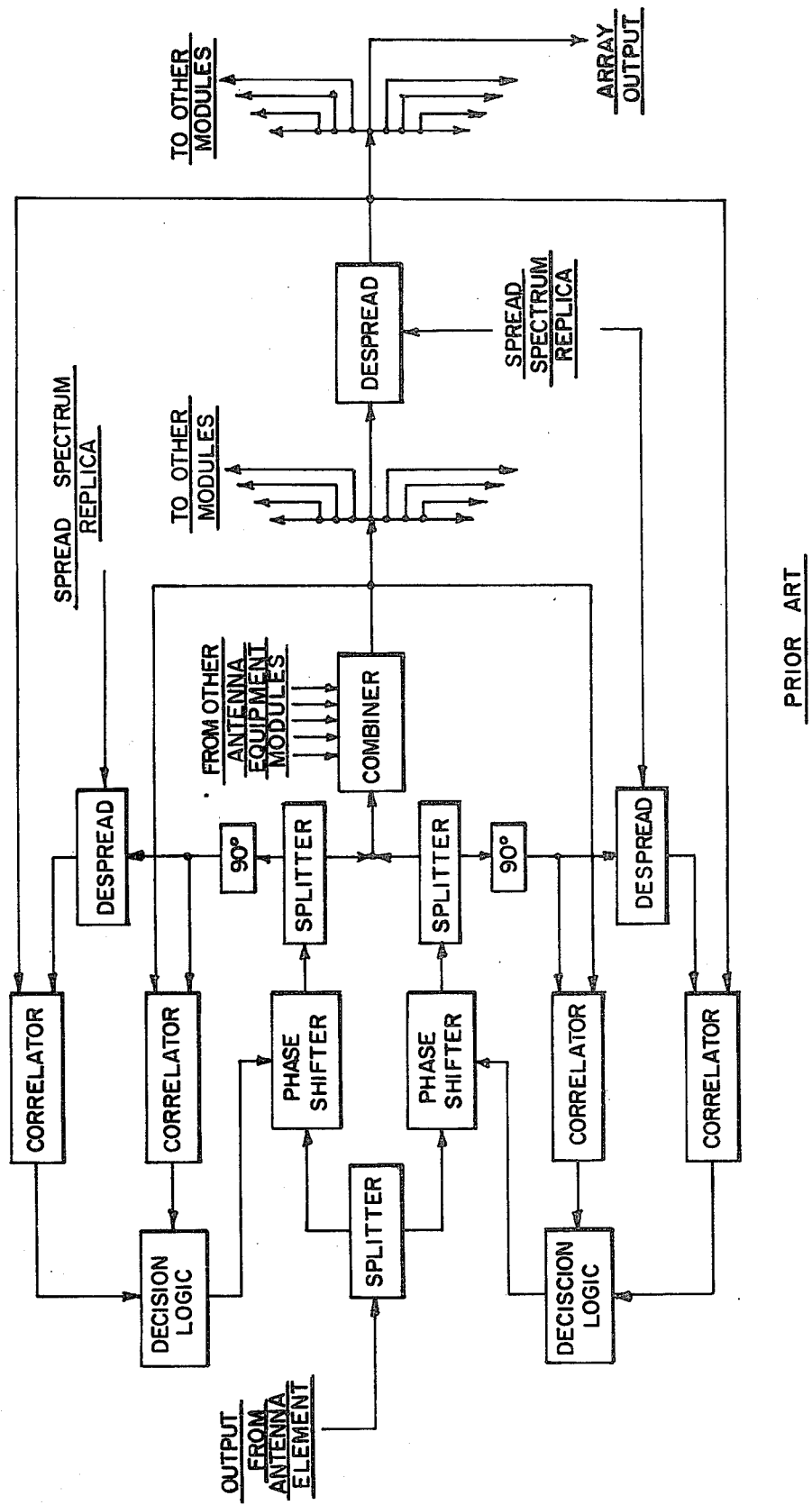
FIG. 1 is a block diagram of an example of typical prior art.
Figures 2, 13:
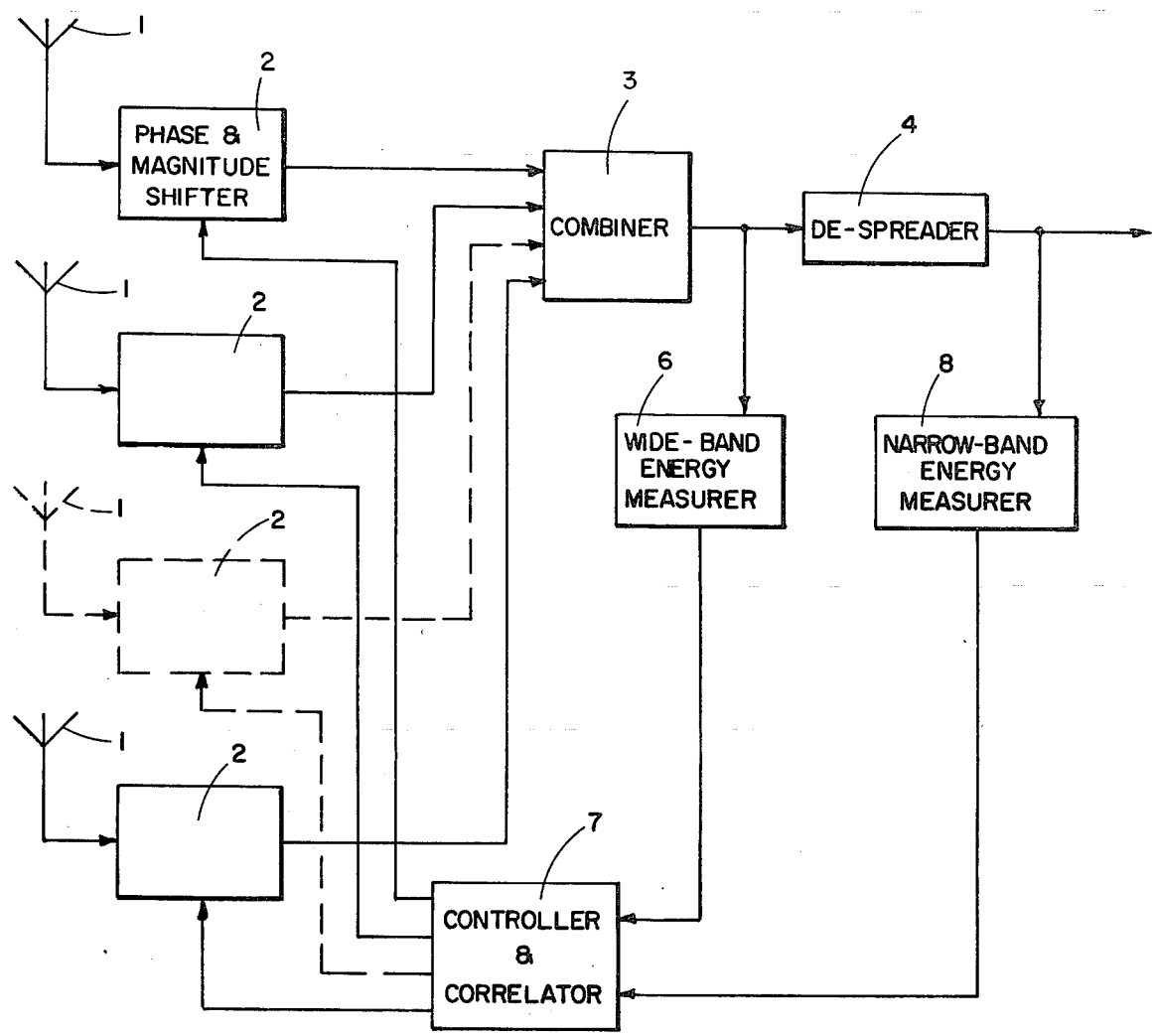
FIG. 2 is a functional diagram of the system of the present invention.
FIG. 13 is a table illustrating an example of an array for use in the microprocessor of the invention.

Referring now to FIG. 2 which is a functional diagram of the system of this invention, the outputs from a plurality of antenna elements 1 are connected to a plurality of phase and magnitude shifters 2. The antenna elements 1 are arranged in any of a number of well known linear, planar, or three-dimensional, regular or irregular configurations (each of the antenna elements itself may be composed of a sub-array of antenna elements which can be similar to or differ from the sub-arrays within the other elements).

The output from each of the antenna elements 1 is modified in magnitude and phase by its corresponding phase and magnitude shifter 2, and the outputs from the elements are then combined in combiner 3. The phase and magnitude shifters 2 may take any of a number of forms, some of which are shown in FIG. 3. The preferred embodiment of the phase and magnitude shifter 2 is that shown in FIG. 3C. Referring now again to FIG. 2, the wide-band output from the combiner 3 goes to despreader 4, where the despreader significantly reduces the spectrum of the desired signal. The despreader 4 contains within it a narrow-band filter comparable in band-width to that of the desired signal after despreading, which narrow-band filter passes to the output of this invention only the band of frequencies occupied by the despread, desired signal. The narrow-band output from the despreader is the output of the system of this invention.

A number of methods exist in the prior art for spreading and despreading communication signals which are suitable for use with this invention (See R. C. Dixon, Spread-Spectrum Systems, Wiley, 1976). For instance, a sinusoidal carrier which has been modulated by wide-band, pseudo-random noise to generate a wide-band "carrier" could, in turn, be modulated by the narrow-band, desired signal to generate a spread-spectrum signal for transmission. Following reception, the spread-spectrum signal again is mixed (i.e. multipled) with a similar, pseudo-noise wide-band "carrier" which has been generated in the receiver, to obtain the narrow-band, desired signal.

The terms "wide-band" and "narrow-band" as used in this specification, and in the claims, are intended to refer only to the relative bandwidths before and after despreading and are not intended to limit the operation of the system to the reception of only those desired signals which exhibit a narrow-bandwidth.

Referring now to FIG. 3C, the output from the antenna element enters splitter 21 and is divided into two parts which are directed to the mixers 22. The signal from local oscillator 25 also is divided into two parts which pass through phase shifters 24 and then are mixed with the divided outputs from the antenna elements in mixers 22. The outputs from the mixers are combined in combiner 26 and fed through the band pass filter 23 which passes the band of frequencies composed of either the sum or the difference of the wide-band signal frequencies and the local oscillator frequency.

The magnitude of the phase shift generated by each of the phase shifters 24 is controlled by the controller and correlator. These changes in phase shift cause related changes in the amplitude and phase of the signal emerging from the band pass filter 23. Referring again to FIG. 2 the phase shifters in each of the phase and magnitude shifters 2 are controlled by the controller and correlator 7.

Figure 3A:
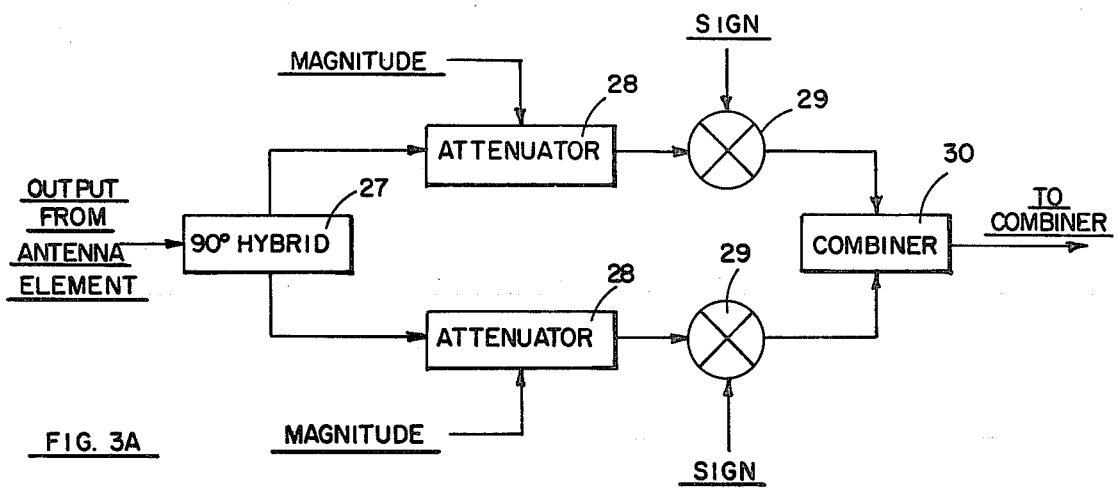
FIGS. 3A through 3C illustrate a number of methods for varying the phase and amplitude of the output from each antenna element.
Figure 3B:
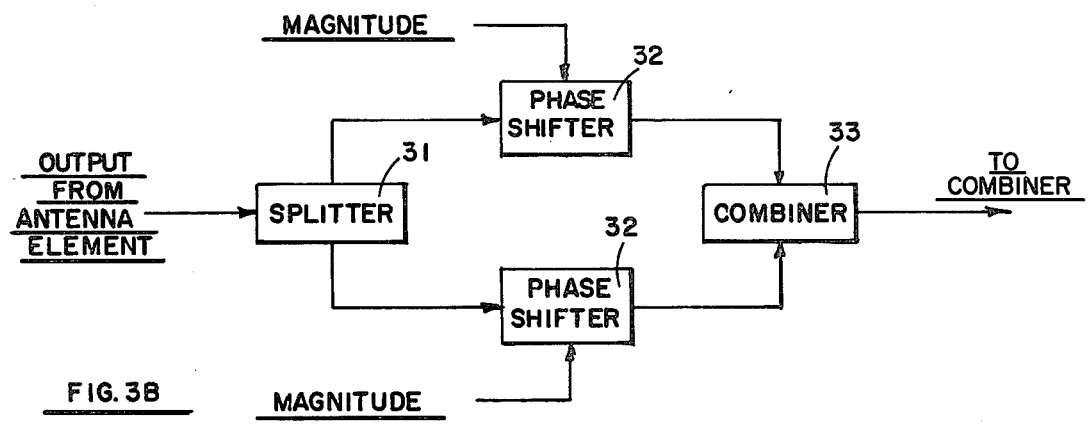
Figure 3C:
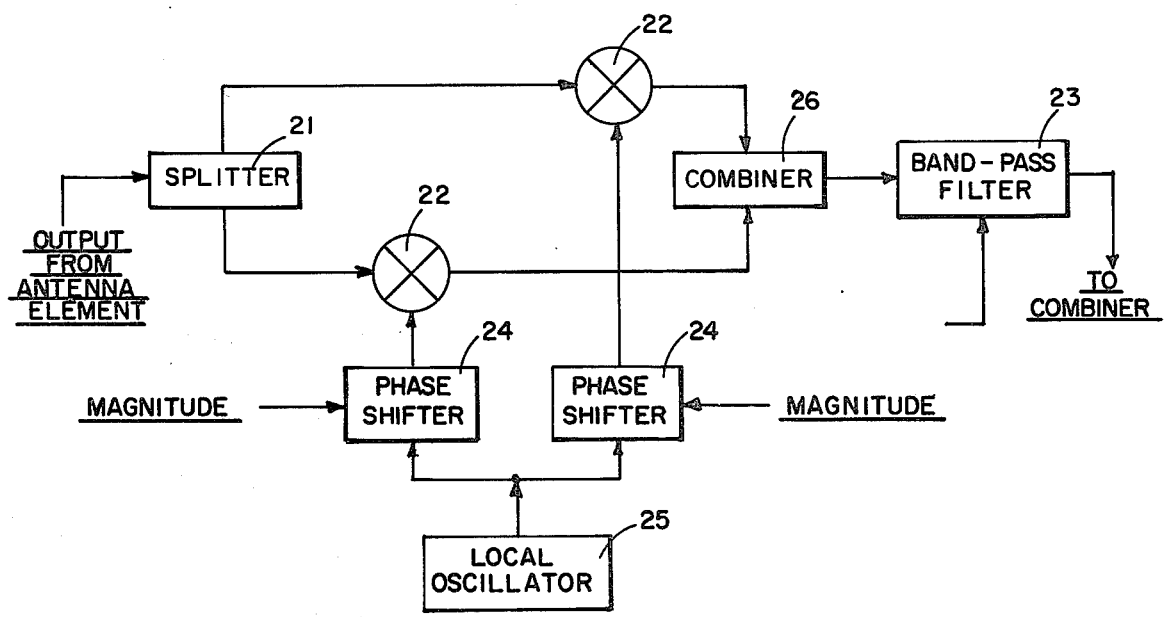

Other embodiments of the phase and magnitude shifters such as those illustrated in FIGS. 3A and 3B could be used instead to control the magnitude and phase of each of the outputs. For instance, as shown in FIG. 3A, the output from the antenna element is split into quadrature components by 90° hybrid 27, which components enter attenuators 28. The magnitudes of the attenuations introduced by attenuators 28 are controlled by the controller and correlator 7 of FIG. 2. The outputs of the attenuators 28 pass through multipliers 29 where the signals are multiplied by +1 or −1 as directed by the controller and correlator 7. The signals from the multipliers 29 are combined in combiner 30 to produce the output which has been shifted in both phase and magnitude.

In the alternative configuration shown in FIG. 3B, the output from the antenna element is split into two parts by splitter 31, which parts are shifted in phase by phase shifters 32, and then combined in combiner 33 to produce an output which has been altered in both phase and magnitude. The phase shifts introduced by phase shifters 32 are controlled by the controller and correlator 7 of FIG. 2.

In fact, it is not necessary to the operation of this invention that both the phase and the magnitude from each antenna element be independently controlled by the controller and correlator. However, better performance will be obtained as a consequence of the additional degrees of freedom arising from such control. For simplicity of explanation, but without limitation, the controller and correlator 7 in FIG. 2 is described hereinafter as controlling the magnitudes of each of the phase shifts introduced by the phase shifters 24 within each phase and magnitude shifter 2, although both the magnitude and the phase of the output from each of the plurality of antenna elements, in fact, will be affected by the controller and correlator.

The controller and correlator 7 introduces a predetermined set of perturbations into the magnitudes of the phase shifts introduced by phase shifters 24 which, in turn, introduce perturbations into the outputs of phase and magnitude shifters 2. The wide-band energy measurer 6 measures the changes in the energy in the wide-band of frequencies emerging from combiner 3 that are caused by these perturbations. In the preferred embodiment, the energy measurer 6 is an envelope detector followed by a low-pass filter, however, a square-low detector or other indicator of energy could be used instead. The controller and correlator 7 correlates the output of wide-band energy measurer 6 with the perturbing function which was generated by controller and correlator 7, and thereby obtains the coefficients which relate the changes in wide-band energy to the phase shifts introduced by the phase shifters 24. These coefficients, which are defined herein as being the components of the energy gradient vector, are measured in the following manner:

A set of orthogonal functions $F_n(i)$ is defined where the index n identifies a particular function and the index i indicates a particular time interval. The orthogonality property results in:

$$\sum_{i=1}^{N} F_n(i)F_m(i) = \delta_{nm} \quad (1)$$

The $F_n$ are selected such that $$\sum_{i=1}^{N} F_n(i) = 0 \quad (2)$$

The functions $F_n(i)$ are multiplied by a predetermined phase shift, $\phi$, and the phase shifts which are introduced by phase shifters 24 are altered from the initial phase shifts, $\phi_n$, in accordance with the following equation:

$$\phi_n(i) = \phi_n + \phi F_n(i) \quad (3)$$

The energy gradient vector components are proportional to the correlation coefficients $C_m$ $$\phi \frac{\delta E}{\delta \phi_m} = C_m \quad (4)$$

The coefficient $C_m$ is measured by correlating $F_m$ with the wide band energy in the manner described by the following equation:

$$C_m = \sum_{i=1}^{N} E[\phi_1(i), \phi_2(i), \ldots \phi_N(i)] F_m(i) \quad (5)$$

Because, for small variations in phase, the energy function, E, can be approximated by the zero and first order terms in a Taylor expansion, $$E[\phi_1, \phi_2, \ldots \phi_N] \approx E[\Phi_1, \Phi_2, \ldots \\ \Phi_N] + E/\phi_1(\phi F_1) + E/\phi_2(\phi F_2) \ldots + E/\phi_N(\phi F_N)$$

and, because of the orthogonality relationships expressed in Equations 1 and 2, the measurement described in Equation 5, yields the mth component of the energy gradient vector, as set forth in Equation 4.

After the components, $C_m$, have been measured, the phase shifters are readjusted to a new set of phase shifts given by $$\Phi_n(\text{new}) = \Phi_n(\text{old}) - 100 \frac{C_n}{\sqrt{\sum_{m=1}^{N} C_m^2}}, \quad (6)$$

where the magnitude of $\phi$ is selected to obtain a rapid reduction in the wide-band energy while maintaining a stable sequence of phase shifter adjustments. Although algorithms other than that shown above could be used for determining the new $\Phi_n$, the above algorithm obtains the largest decrease in wide-band energy for a given sum of the squares of the changes in the phase shifts caused by the phase shifters 24.

The sequence of operations consisting of the introduction of phase perturbations, the measurement of wideband energy, and the correlation and readjustment of the phase shifters is repeated until either a minimum is reached in the magnitude of the wide-band energy emerging from combiner 3, or until the magnitude of the wide-band energy becomes comparable to that of the narrow-band energy emerging from despreader 4, whichever occurs first.

Following satisfaction of either of the foregoing conditions, the system of this invention then operates to increase the desired signal in the narrow-band output without, at least to first order, increasing the interfering signals in the output of the system. The system operates in the following manner: First, a set of N dimensional unit orthogonal vectors $$\vec{U}^{(1)} \equiv (u_1^{(1)}, u_2^{(1)}, \ldots, u_N^{(1)})$$

$$\vec{U}^{(2)} \equiv (u_1^{(2)}, u_2^{(2)}, \ldots, u_N^{(2)}) \quad (7)$$

$$\vec{U}^{(N-1)} \equiv (u_1^{(N-1)}, u_2^{(N-1)}, \ldots, u_N^{(N-1)})$$

are defined such that they are also orthogonal to the wide-band energy gradient vector, $\vec{C}$, i.e., $\vec{U}^{(n)} \cdot \vec{C} = 0$ where $\vec{C} \equiv (C_1, C_2, \ldots, C_N)$.

The component, $U_k{}^n$, of the vector $\vec{U}^{(n)}$ represents the normalized perturbation of the kth phase shifter. The phase shifts introduced by the phase shifters are then perturbed by the controller for each value of n from n=1 to N-1, in accordance with the following equation:

$$\vec{\phi}^{(n)}(i) = \vec{\Phi} + \phi \vec{U}^{(n)} F_n(i), \quad (8)$$

where the phase shift introduced by the "k"th phase shifter is given by $\phi_k{}^{(n)}(i) = \Phi_k + \phi u_k{}^{(n)} F_n(i)$. because the perturbations have been selected to be orthogonal to the wide-band energy gradient vector, these perturbations cause no first order change in the wide-band energy.

The narrow-band energy, E', emerging from the despreader 4 is measured by narrow-band energy measurer 8, and the change in the narrow-band energy is correlated in controller and correlator 7 with the perturbing functions $F_n$ to obtain the coefficients, $C_m'$, as given by $$C'_m = \sum_{i=1}^{I} E'[\phi_1^{(m)}(i), \phi_2^{(m)}(i), \ldots, \phi_N^{(m)}(i)] F_m(i) \quad (9)$$

The phase shifters are then readjusted to provide new phase shifts given by the following:

$$\vec{\Phi}(\text{new}) = \vec{\Phi}(\text{old}) + \phi \frac{\sum_{m=1}^{N-1} C'_m \vec{U}^{(m)}}{\sum_{m=1}^{N-1} (C'_m)^2} \quad (10)$$

By means of the algorithms given above, the preferred embodiment yields the greatest change in narrow-band energy for a given sum of the squares of the changes in phase shifts without, at least to first order, affecting the wide-band energy.

If the wide-band energy increases above a certain level as a result of maximizing the narrow-band energy, then the controller reverts to the measurement of the coefficients $C_m$ and the readjustment of the phase shifters in order to further reduce the wide-band energy. The system alternates between making a series of measurements and adjustments to the phase shifters to decrease the wide-band energy, and making a measurement and an adjustment to increase the narrow-band energy.

As indicated above, the magnitudes of the phase adjustments are proportional to $\phi$. As the system approaches the optimum adjustments of the phase shifters, $\phi$ is decreased towards zero. In the preferred embodiment $\phi$ is proportional to the ratio of the magnitude of the wide-band energy to the magnitude of the wide-band energy from a single "reference" antenna element. As a consequence smaller adjustments are made to the phase shifters as the system approaches the optimum.

Figure 4:
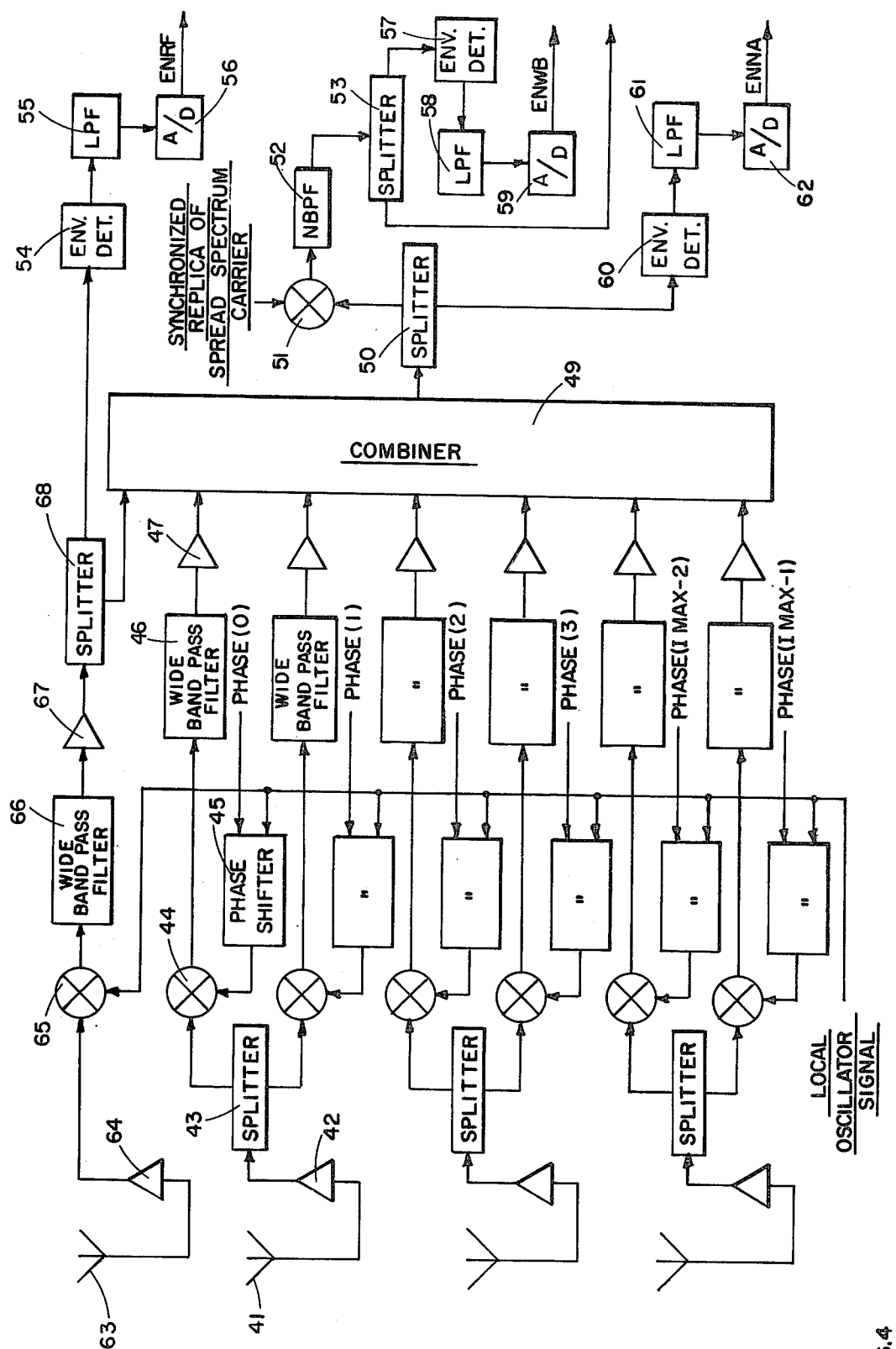
FIG. 4 is a more detailed block diagram of the system of this invention, excepting the controller and correlator.

Referring now to FIG. 4, the figure illustrates in more detail the preferred embodiment of this invention (with the exception of the controller and correlator 7). The radio frequency signal from antenna element 41 is input to amplifier 42 where it is amplified and then input to splitter 43 where the signal is divided into two parts. One part of the radio frequency signal emerges from splitter 43 and is input to mixer 44 where it is mixed with a phaseshifted local oscillator signal. The local oscillator signal is input to phase shifter 45 where it undergoes a phase shift in an amount determined by the controller and correlator and then is input into mixer 44. The output of mixer 44 is input into wide bandpass filter 46 which passes only a selected band of frequencies. The output of wide bandpass filter 46 is input into amplifier 47 where the signal is amplified and the output enters combiner 49. The second part of the radio frequency signal emerging from splitter 43 passes through a similar set of devices. The radio frequency output from each of the plurality of antenna elements, similar to antenna element 41, passes through a splitter, mixer, amplifier and filter similar to those through which the signal from antenna element 41 passes, and all the signals are then combined in combiner 49. The output of combiner 49 is input to splitter 50, where it is split into two parts, one of which enters envelope detector 60 where the signal is envelope detected and then fed to low pass filter 61 which passes only those frequencies below its cut-off frequency. The output of the low pass filter is input to analog-to-digital converter 62, which in turn generates a digital number representing the wide-band energy.

The other output of splitter 50 enters mixer 51 where it is mixed with a locally-generated, spread-spectrum carrier to despread the desired signal. The output of the mixer 51 is input into narrow bandpass filter 52 which passes only the narrow band of frequencies occupied by the desired signal following despreading. The output of narrow band filter 52 is input to splitter 53, where the desired signal is split into two parts, one part being the output of the system, the second part being input to envelope detector 47 where the envelope is detected and input to low pass filter 58 whose output in turn enters analog to digital converter 59, which generates a digital number representing the narrow band energy.

As indicated in FIG. 4, the radio frequency signal output from a reference antenna element, in this case antenna element 63, is processed slightly differently. The signal from antenna element 63 passes through amplifier 64 but does not pass through a splitter before entering mixer 65. After passing through wide bandpass filter 66 and amplifier 67, it then passes through splitter 68 which divides the signal into two parts, one part of which enters combiner 49 to be combined with the output from each of the other antenna elements. The other part of the output from splitter 68 is input into envelope detector 54, where its envelope is detected, and output to low pass filter 55 which passes only those frequencies below its cut-off frequency, to analog to digital converter 56, which, in turn, generates a digital number which represents the energy in the radio frequency signal received by the reference antenna element.

The bandwidths of wide bandpass filter 66 and each of the plurality of wide bandpass filters 46 are as large or slightly larger than the bandwidth of the spread spectrum of the received signal. The bandwidth of the narrow bandpass filter 52 is as large or slightly larger than the bandwidth of the despread, desired signal. The bandwidths of the low pass filters 55, 58 and 61 are large compared to the bandwidth of the narrow bandpass filter 52, but are small compared with the center frequency of the signal entering each of the envelope detectors.

Referring again to FIG. 2, the preferred embodiment of controller and correlator 7 is described in more detail by means of a series of figures, FIGS. 5 through 10. Controller and correlator 7 is, in effect, a special purpose computer which operates upon digital data input to it from analog to digital converters 56, 59 and 62, which data represent measurements of the reference energy, the narrow band energy and the wide band energy during the preceding measurement interval.

Figure 5:
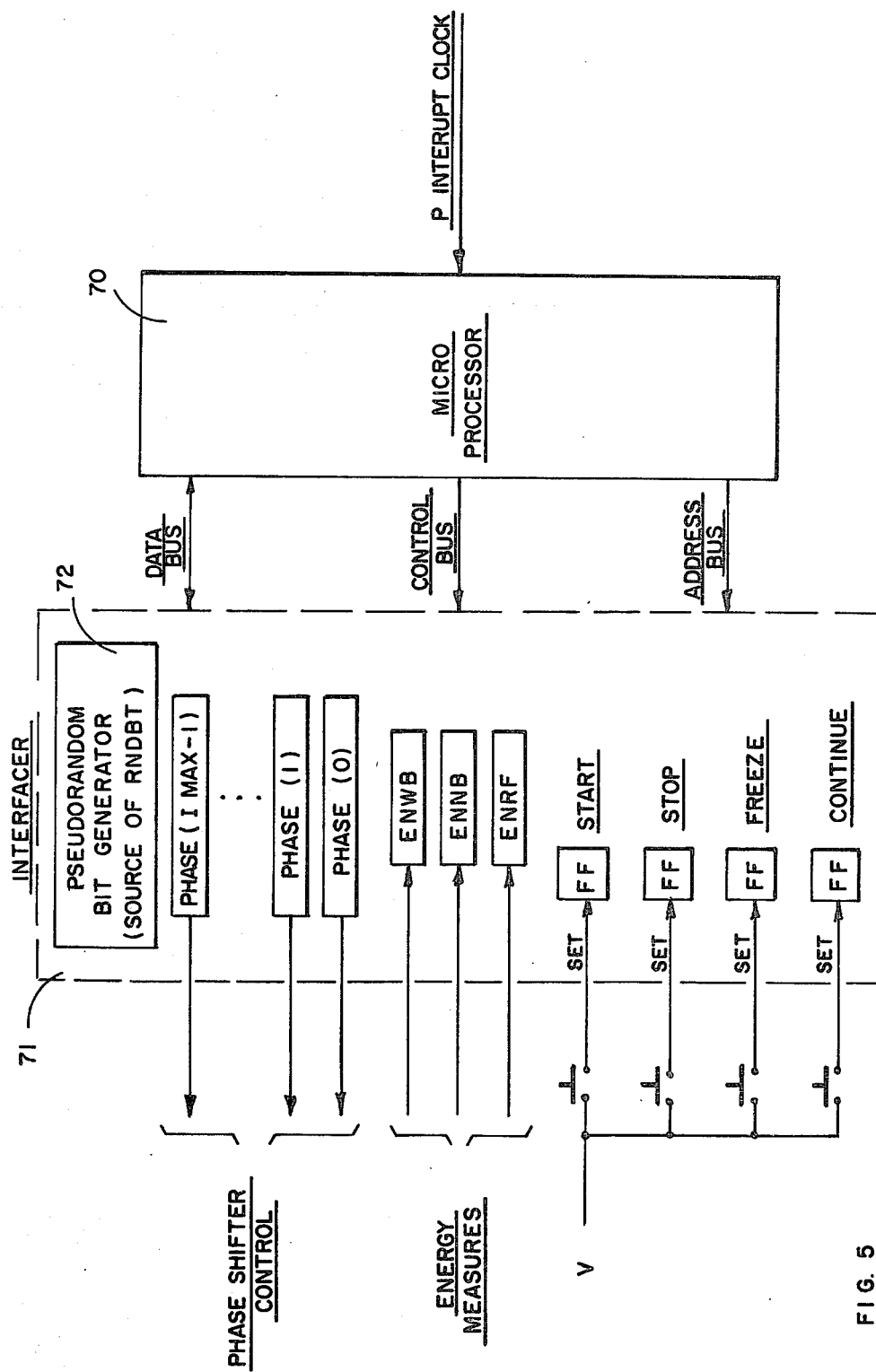
FIG. 5 is a block diagram of the controller and correlator.

As illustrated in FIG. 5, the controller and correlator is composed of a microprocessor 70 and an interfacer 71. The interfacer 71 stores in registers the phase shifts supplied by the microprocessor 70 which control the phase shifters illustrated in FIG. 4. The interfacer 71 also receives the energy measurements from the analog to digital converters 56, 59 and 62 and stores these values in registers which can be accessed by the microprocessor 70. The interfacer 71 contains manual input controls for starting, stopping, freezing and continuing the operations of the microprocessor 70, and also contains a pseudo-random bit generator 72 which provides a source of pseudo-random binary digits for use by the microprocessor 70.

Figure 6:
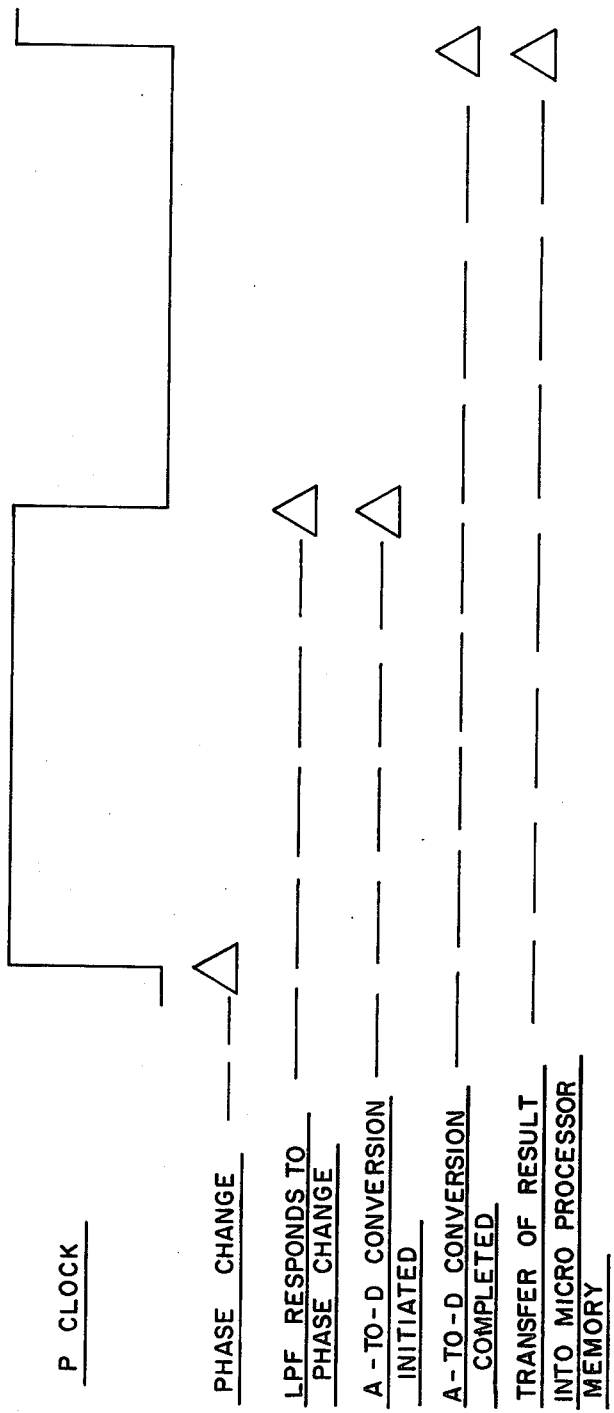
FIG. 6 illustrates the temporal relationship between the introduction of phase shifts, the response of the system, the measurement of this response, and the conversion of the measurement to a digital format.

FIG. 6 illustrates the temporal relationships between the timing signals from "P clock" (which times the phase changes introduced in the L.O. signals), the response of each low pass filter 55, 58 and 61, to the change in input from the associated envelope detectors, the conversion into a digital number of the analog measurement of the output from the low pass filter, and the transfer of this data into the microprocessor memory within the controller and correlator.

Figure 7:
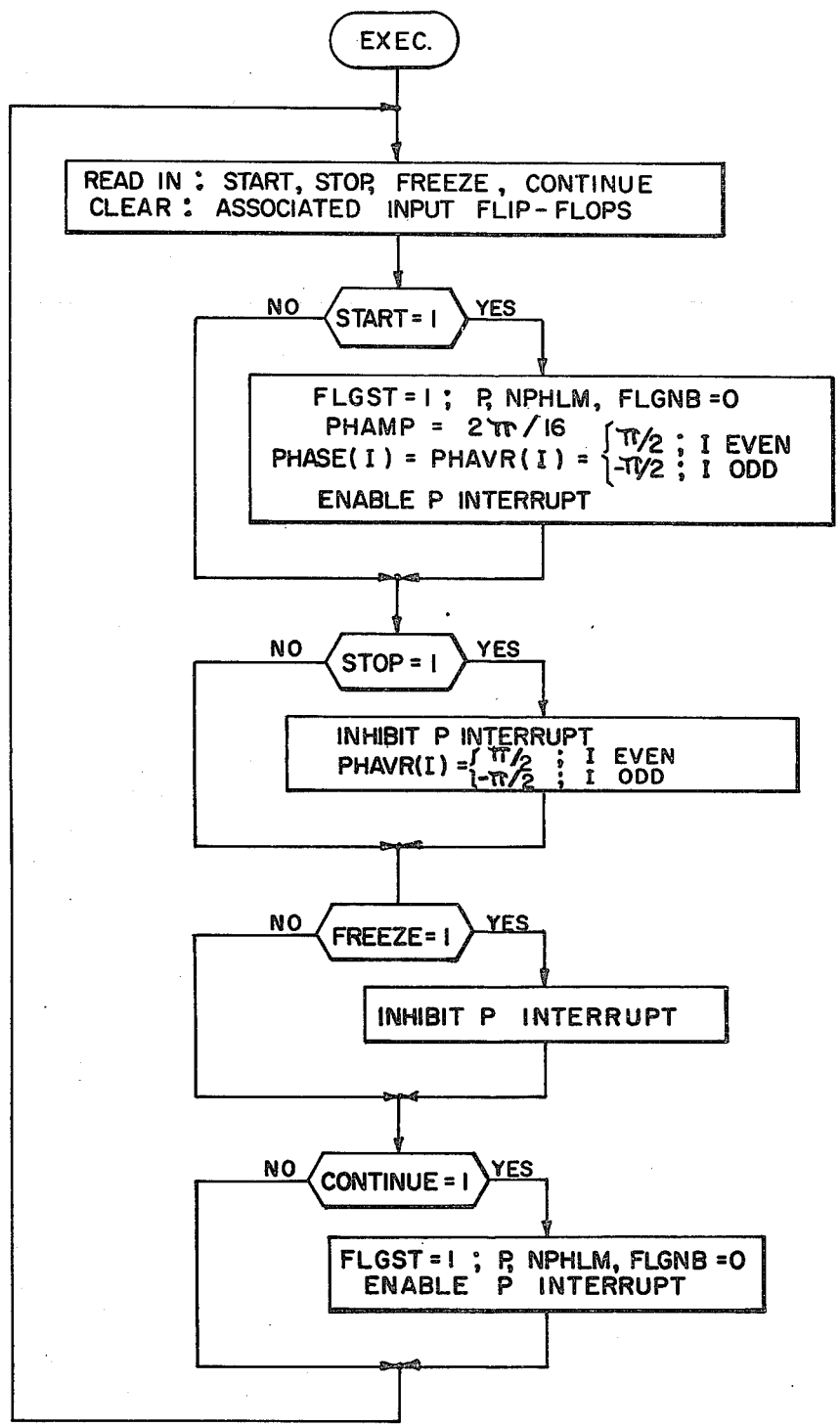
FIG. 7 is a flow diagram of the executive control of the controller and correlator.

The control and operation of the microprocessor is best illustrated by computer program flow diagrams. FIG. 7 illustrates the executive control of the microprocessor. "P Interrupt" denotes an interrupt channel to the microprocessor that is driven by the P clock.

Figure 8A:
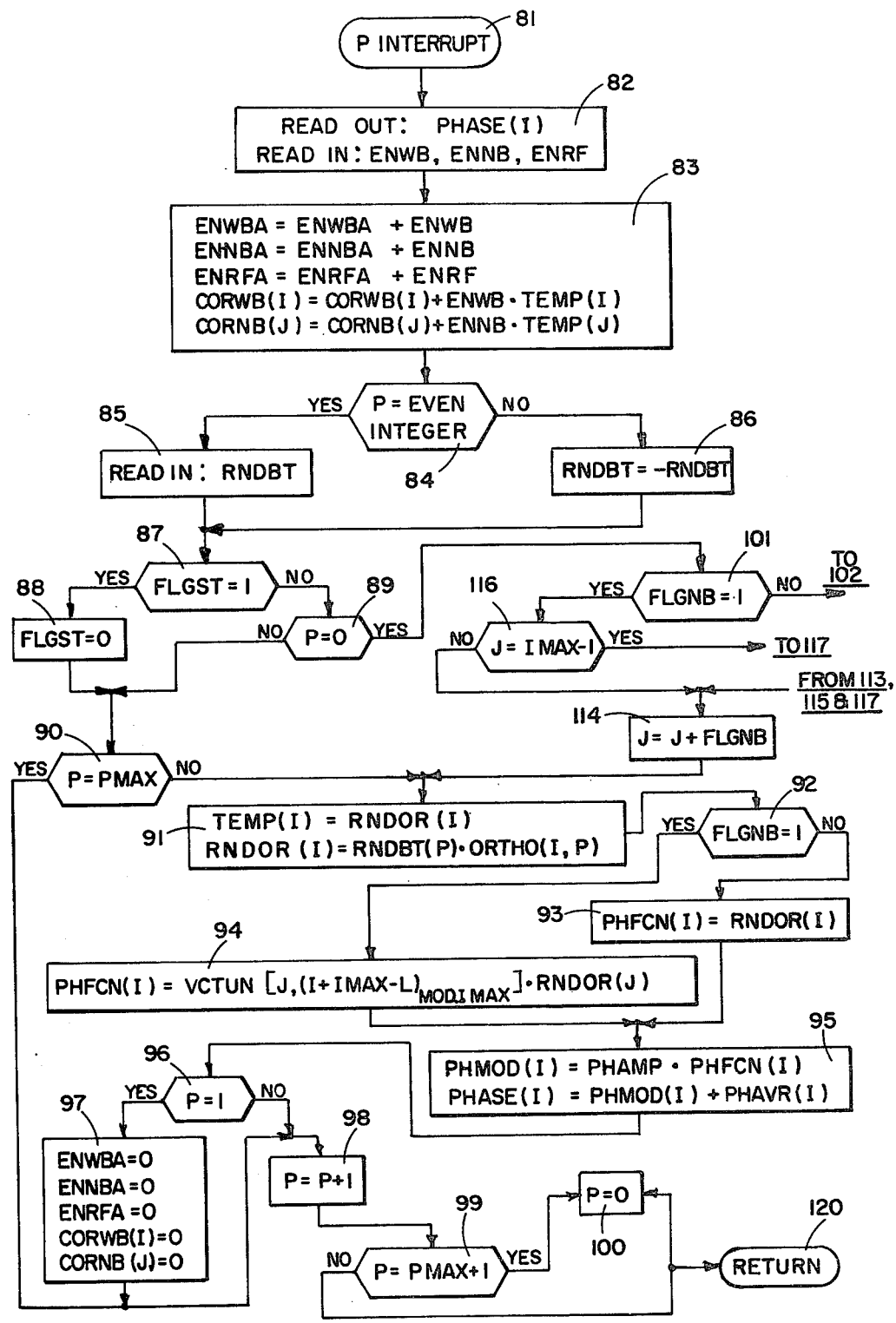
FIGS. 8A and 8B are flow diagrams of the operation of the controller and correlator.
Figure 8B:
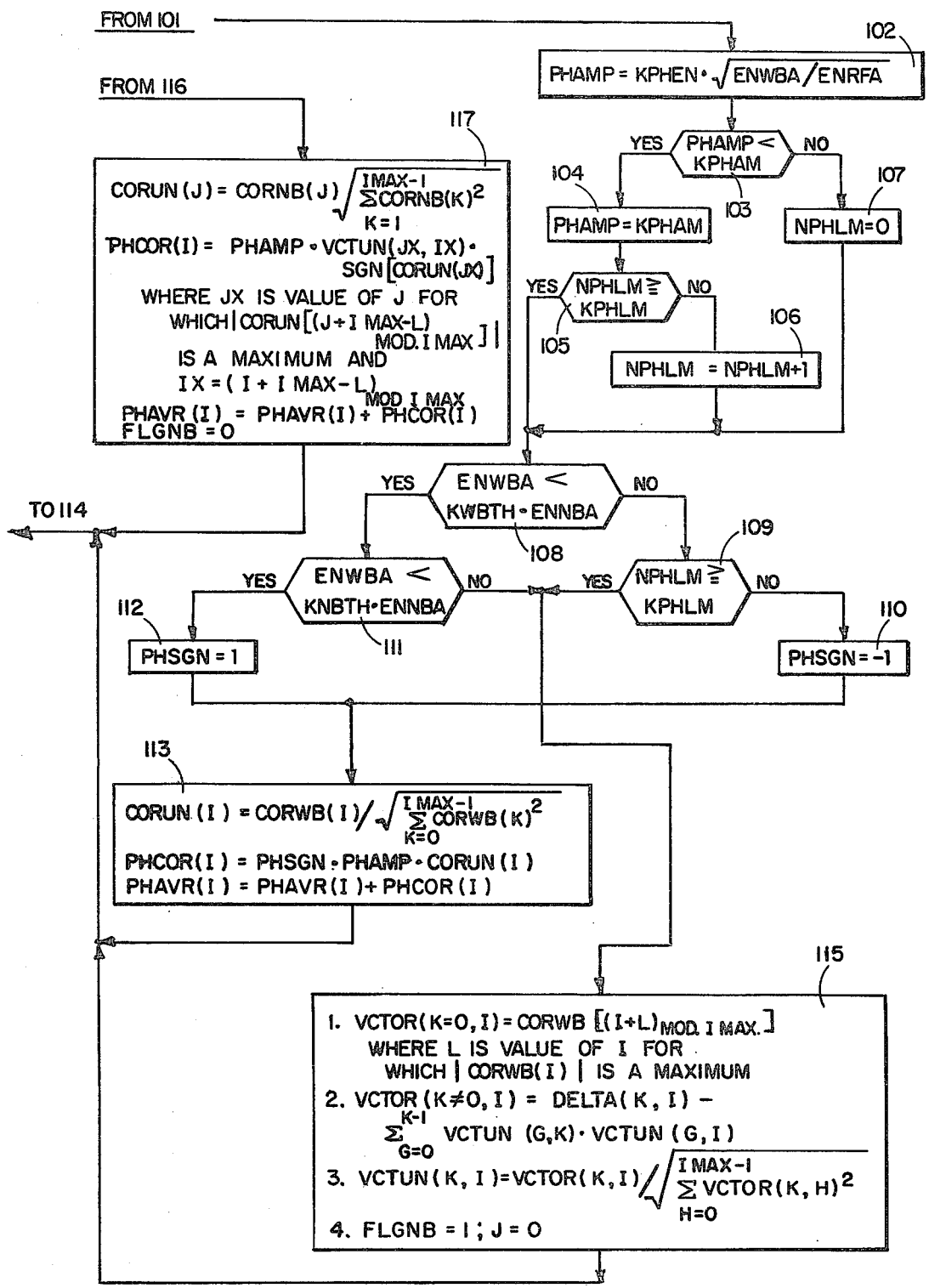

FIG. 8A and FIG. 8B together illustrate the flow diagram for the microprocessor. The word symbols used in the flow diagram refer to locations in memory. An expression such as ENWBA=ENWBA+ENWB means that the number stored in memory location ENWBA is added to the number stored in memory location ENWB and the result is stored in memory location ENWBA. Names beginning with K's represent constants. In the preferred embodiment KPHEN=0.25, KPHAM=0.01227, KPHLM=5, KWBTH=3.25, KNBTH=1.20. The flow diagram in FIGS. 8A and 8B is repeated in FIGS. 9A, 9B, 10A, 10B, and 11A, 11B, but with the addition of heavy lines which indicate the sequence of microprocessor operations during different phases of the system's operation.

Referring now to FIG. 7, the actuation of the start button sets START=to 1 and enables the P interrupt which causes the microprocessor to perform a series of logical/arithmetic operations each time there is a positive transistor of the P clock signal. As indicated in FIG. 7, the microprocessor begins operation with P set equal to 0 and with certain values specified for other of the computer variables.

Figure 9A:
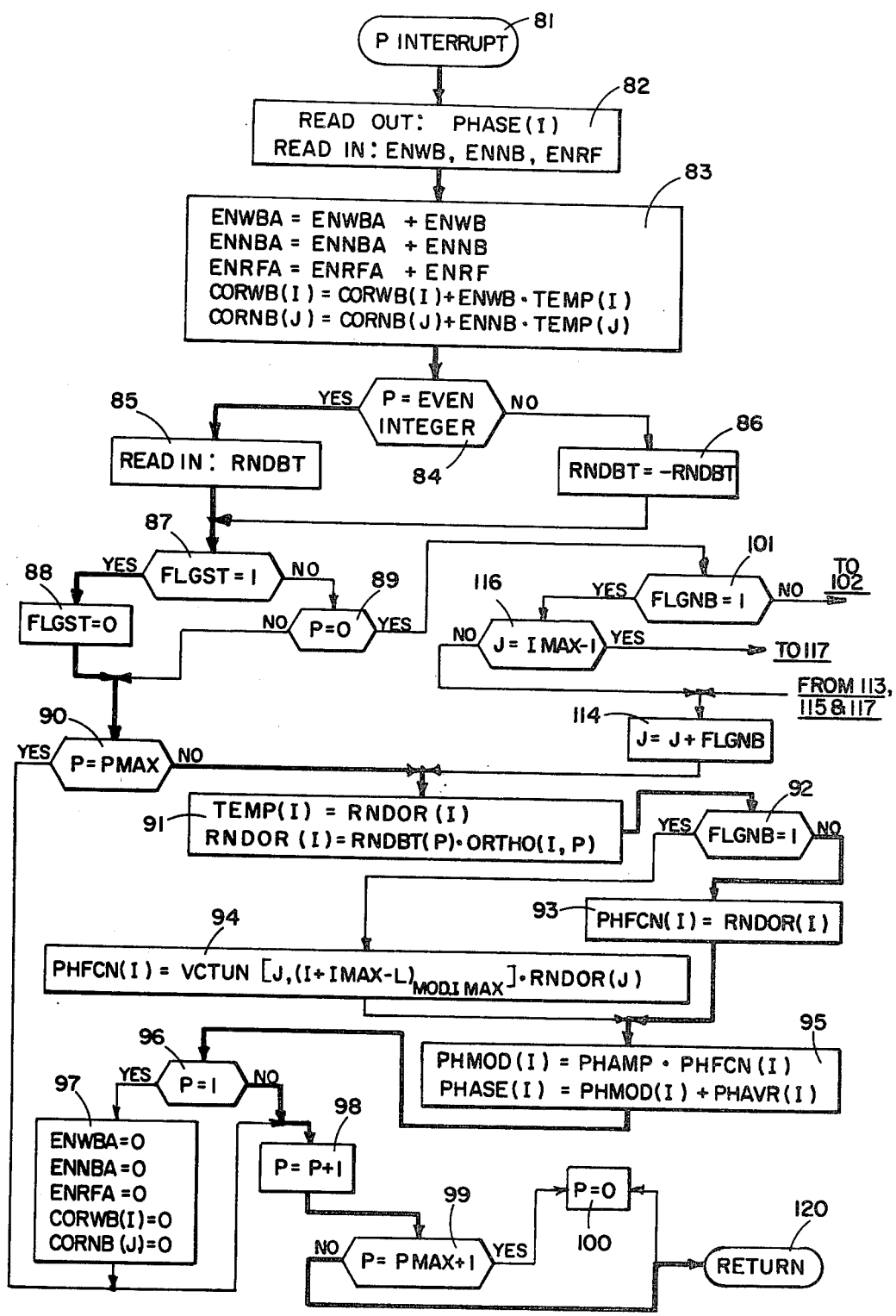
Figure 9B:
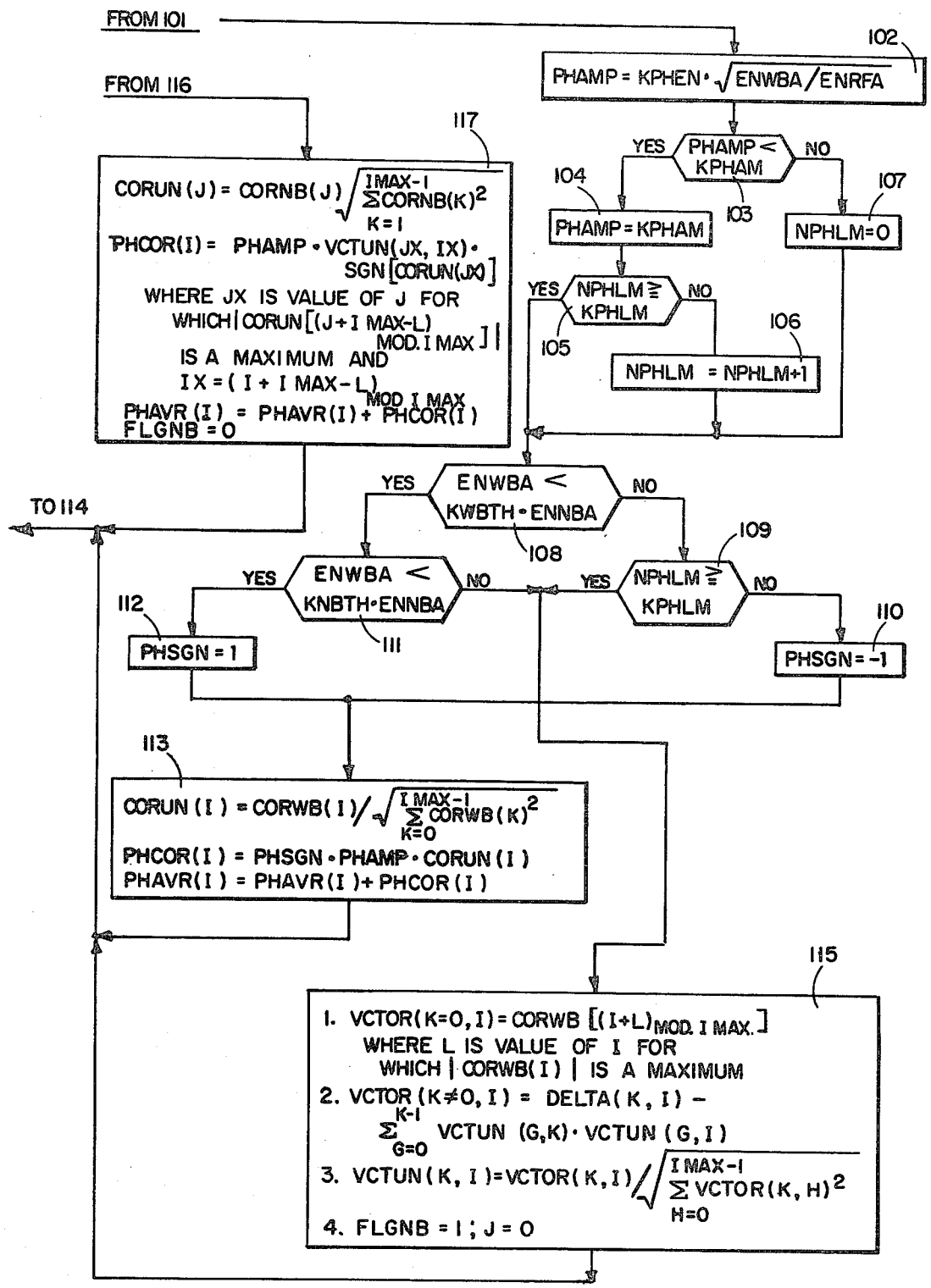

Referring now to FIGS. 9A and 9B, the operation of the microprocessor initially follows the path indicated by the heavy line, beginning at Box 81 and ending at Box 120. The initial values of phase shifts, PHASE (I), for the plurality of phase shifters during the initial measurement period are calculated by the operations indicated in Boxes numbered 91, 93 and 95.

For this purpose, an array of ones and minus ones is stored at ORTHO (I,P) which satisfies the requirement that $$\sum_{P=0}^{PMAX-1} ORTHO(I_1,P)\, ORTHO(I_2,P) = \begin{cases} 0 & ; I_1 \neq I_2 \\ PMAX & ; I_1 = I_2 \end{cases}$$

and ORTHO(I,P even)=ORTHO(I,P+1) An example of such an array for PMAX=and IMAX=6 is shown in the table of FIG. 13.

The second pass through the flow diagram for P=1 follows essentially the same path as the first pass for P=O, except that the sign of RNDBT is reversed in Box 86, which, in turn, reverses the signa of the phase shifts PHASE (I). RNDBT represents the output of the pseudo-random bit generator which generates a pseudo-random sequence of plus an minus ones. Although the inclusion of the operation related to RNDBT is not necessary to the operation of the invention, it does make the operation of the system of this invention relatively insensitive to interfering, undesired signals which may be similar in nature to the deterministic perturbing functions $F_n(i)$. The second pass through the flow diagram also sets to zero the values of ENWBA, ENNBA, and ENRFA, which are the averages over IMAX measurement intervals of the energy measurements of the wide band energy, the narrow band energy and the reference radio frequency energy. The correlations of the wide band (CORWB (I)) and narrow band (CORNB (J)) energies with the small changes in phase shifts which have been introduced by the microprocessor are also set to zero by the operations listed in Box 97.

With minor differences the operations indicated in FIG. 9 are repeated for integral values of "P" until "P" equals PMAX+1. Box 99 then causes "P" to be set equal 0 at Box 100. As "P" increases from 0 to PMAX+1, the microprocessor generates a sequence of phase shifter perturbations (Boxes 91, 93 and 95), and calculates (Box 83) the values of the correlation of the wide band energy (CORWB) and the correlation of the narrow band energy (CORNB) with the incremental phase changes introduced in the phase shifters by the microprocessor. FIG. 12 illustrates the temporal relationships of these operations.

Figure 10A:
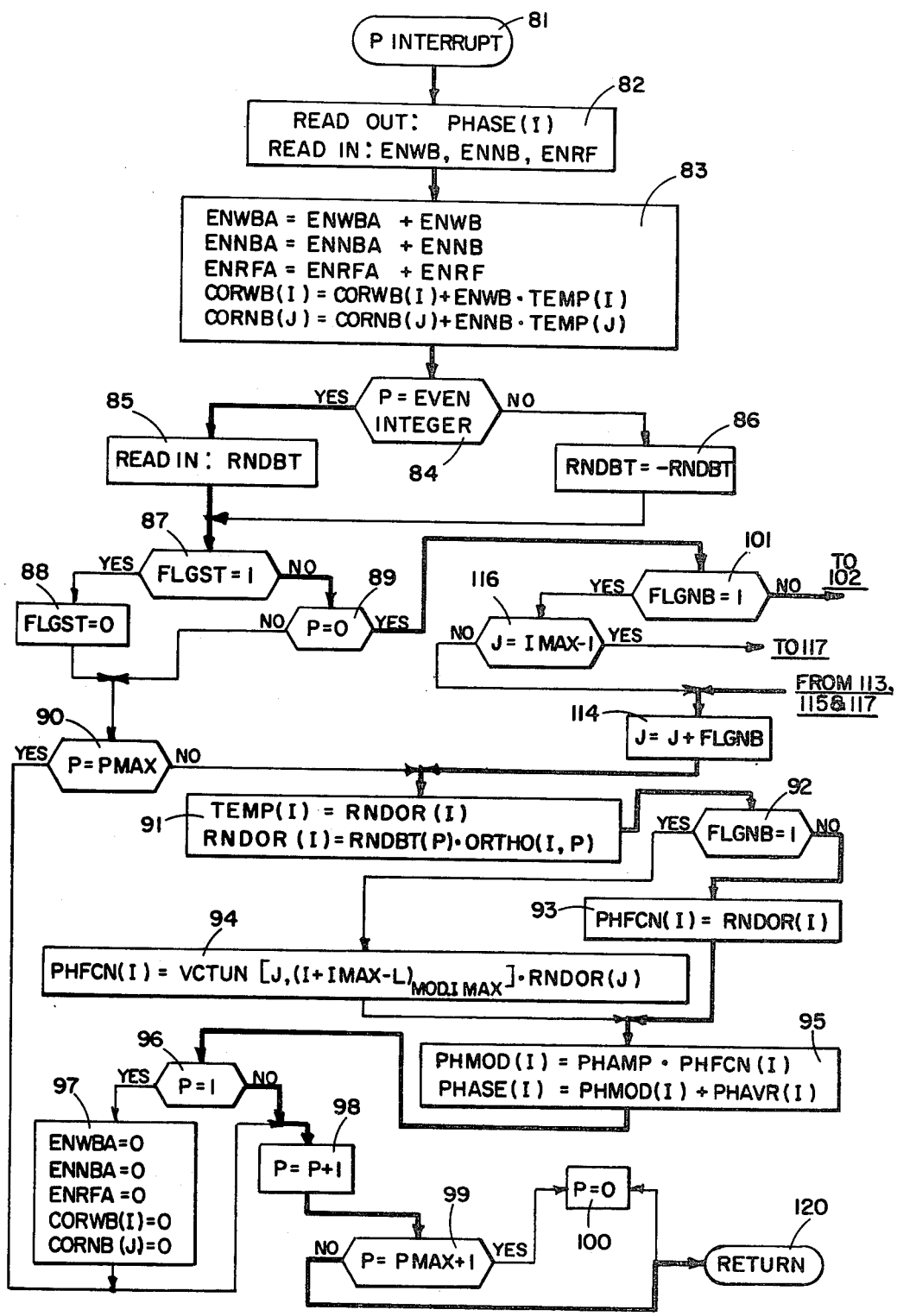
Figure 10B:
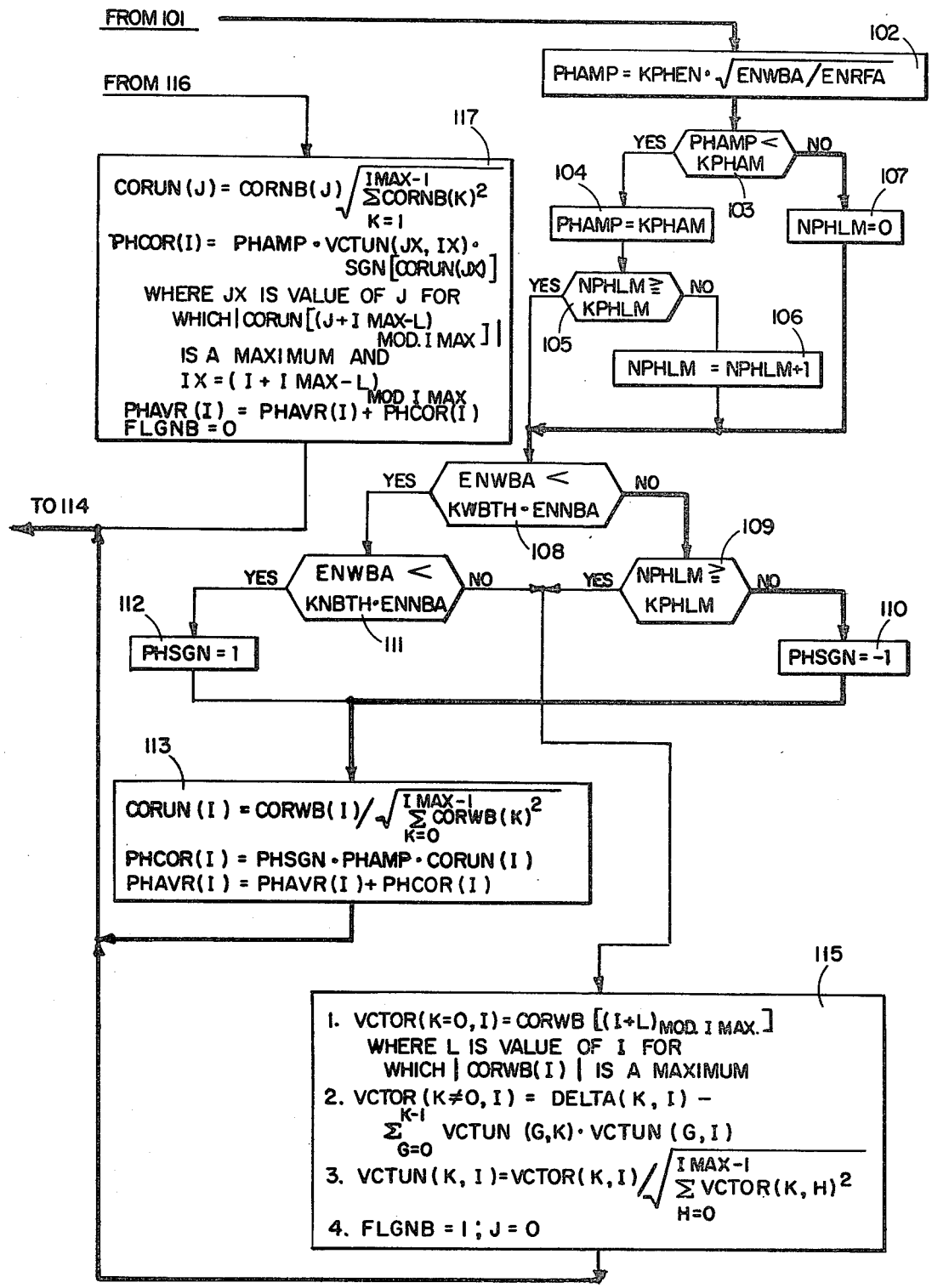

Referring now to FIGS. 10A and 10B, on the next pass through the flow diagram, when P again equals 0, the processor passes through Box 113 where a set of phase shifts are calculated for the phase shifters, which will reduce the wide band energy output from the system. The sequence of events illustrated by FIGS. 9A and 9B, and discussed in relation thereto, are then repeated, followed again by the operations illustrated in FIGS. 10A and 10B.

Referring again to FIGS. 10A and 10B, in the event that the desired signal constitutes most of the energy received by the system, the operation listed in Boxes 108, 111 and 112, in combination with Box 113, intervene to cause the system to increase the wide band energy and, as a consequence, the narrow band energy and the desired signal output from the system.

Referring again to FIGS. 10A and 10B, when the point is reached such that either the wide band energy becomes comparable to the narrow band energy, or the process illustrated in FIGS. 10A and 10B has been repeated KPHLM times, the flow of operation is diverted once through Box 115 wherein orthogonal sets of phase shifts are constructed for use in increasing the narrow band energy without, at least to first order, affecting the wide band energy, DELTA (K,I) in Box 115 is defined as follows:

$$DELTA\ (K,I) = \begin{cases} 0\ ;\ K \neq I \\ 1\ ;\ K = I \end{cases}$$

Figure 11A:
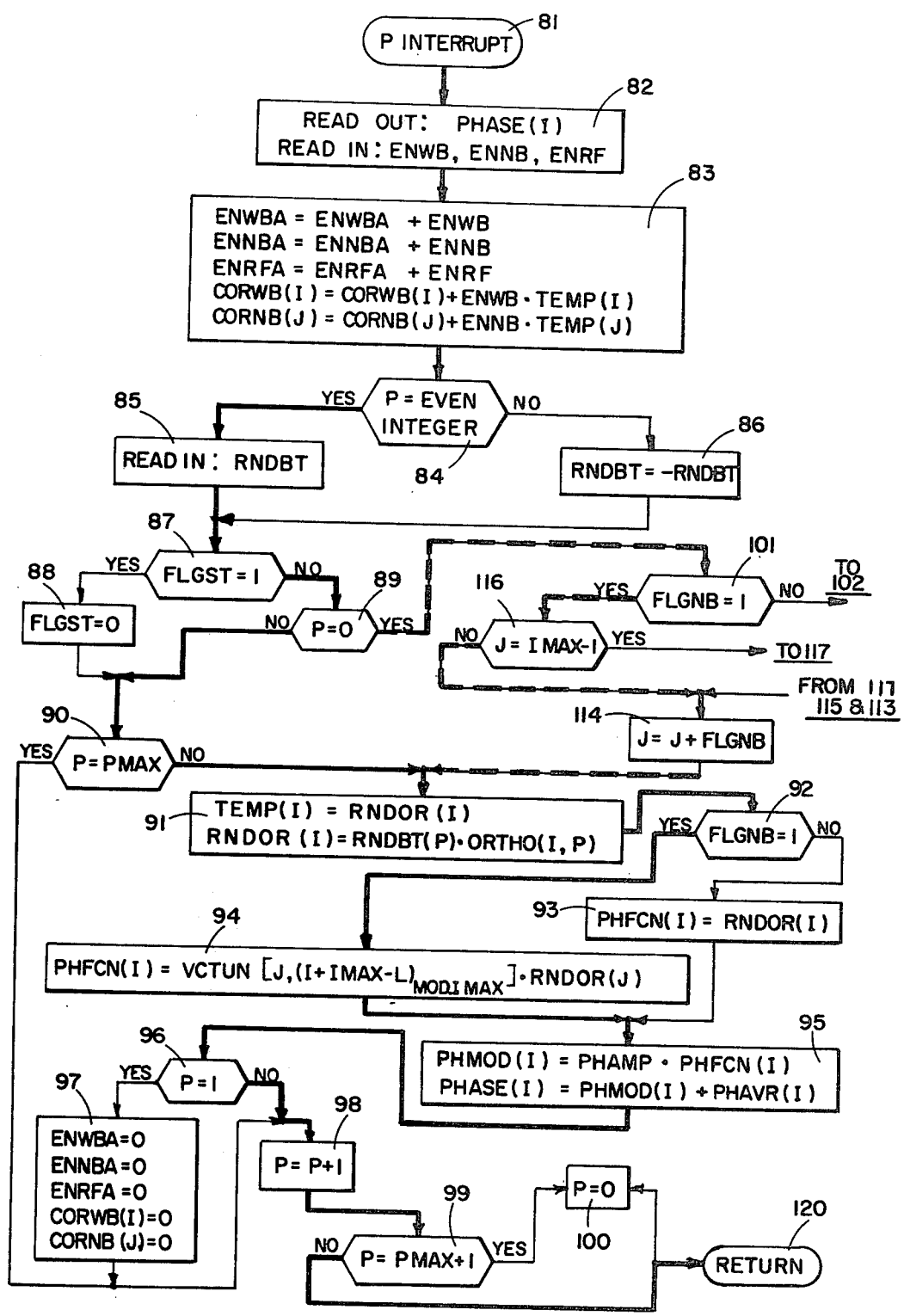
Figure 11B:
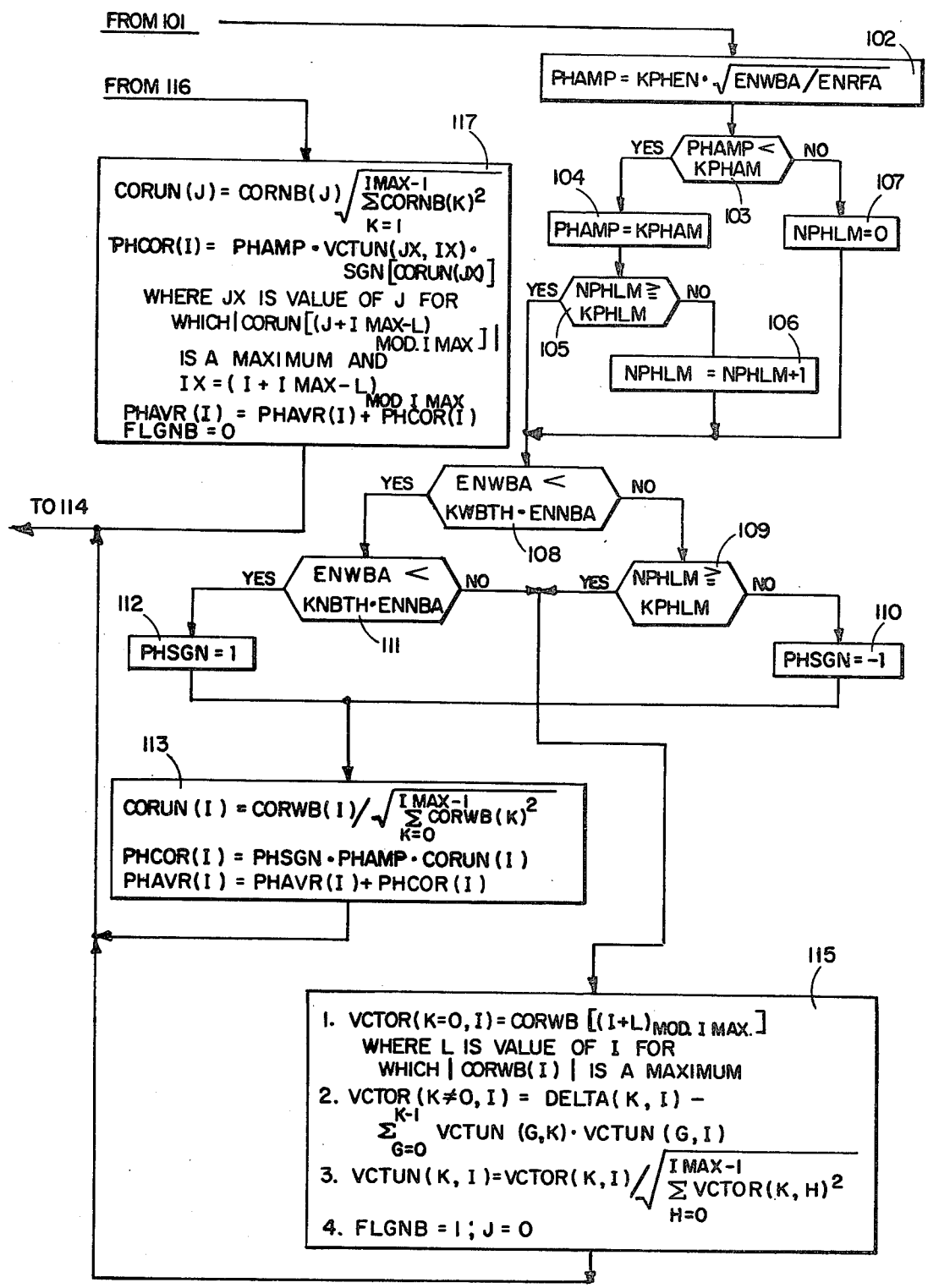

The system then shifts to the sequence of operations illustrated in FIGS. 11A and 11B to measure the effect of the orthogonal sets of phase shifts on the narrow band energy. The path of operations indicated in FIGS. 11A and 11B by the heavy lines is repeated IMAX times. The flow then diverts for one pass through the dotted path indicated in FIGS. 11A and 11B and then reverts to the path indicated by the heavy line. This sequence of operations is repeated until the flow has diverted through the dotted path IMAX−1 times, at which time the operations in Box 117 are executed. The equations shown in Box 117 calculate new values of phase shifts for the phase shifters which increase the narrow band energy without, to first order, increasing the wide band energy output from the system. Box 117 then resets FLGNB to zero which causes the entire sequence of operations illustrated in FIGS. 9A, 9B through 11A, 11B to be repeated.

As disclosed herein, the preferred embodiment contains means for changing both the phase and the magnitude of the output from each antenna element, which elements themselves also can consist of a number of antenna elements. However, the system of this invention also can operate successfully with a lesser number of phase and magnitude shifters. For instance some of the antenna elements could be connected directly to the combiner and the system would still be able to operate. Furthermore, each phase and magnitude shifter need not be capable of independently varying both phase and magnitude. It is sufficient that the controller vary either the phase or the magnitude or some combination thereof in whatever number of phase and magnitude shifters are included in the system, however, better performance will be obtained if two phase shifters are associated with each antenna element, excepting one element which is used as a reference.

I claim:

1. An adaptive receiving antenna system comprising:
   a. a plurality of antenna elements for receiving electromagnetic signals,
   b. a plurality of signal varying means connected to the outputs of predetermined ones of the antenna elements for varying each of the outputs of said predetermined antenna elements,
   c. output combining means connected to the outputs of the signal varying means, and to the antenna elements to which no signal varying means are connected, for receiving and combining the outputs of the predetermined ones of the signal varying means and the outputs of the antenna elements to which no signal varying means are connected,
   d. wide-band energy measurement means, connected to the output of the output combining means, for measuring the wide-band energy therein,
   e. despreader means, connected to the output of the output combining means, for receiving and despreading the spectrum of the desired signal and for reducing the band-width of the signals emerging from the despreading means,
   f. narrow-band energy measurement means, connected to the output of the despreader means, for measuring the narrow-band energy therein, and
   g. controller and correlator means connected to the output of the wide-band energy measurement means and to the output of the narrow-band energy measurement means, which correlator and controller means controls each of the signal varying means to introduce variations into the outputs from the signal varying means so as to decrease the output from the wide-band energy measurement means and increase the output from the narrow-band energy measurement means.

2. The system as described in claim 1 wherein the signal varying means comprise phase shifting means for varying the phase of the output of the signal varying means.

3. The system as described in claim 1 wherein the signal varying means comprise magnitude varying means for varying the magnitudes of the outputs from the signal varying means.

4. The system as described in claim 1 wherein the signal varying means comprise phase and magnitude shifting means for varying the phases and magnitudes of the outputs from the signal varying means.

5. The system of claim 1 or 2 or 3 or 4 wherein the controller and correlator means in addition comprises random bit means for generating and inserting pseudo-random changes in the variations introduced into the signal varying means by the controller and correlator means.

* * * * *